(12) United States Patent
Chou

(10) Patent No.: US 7,227,539 B2
(45) Date of Patent: Jun. 5, 2007

(54) ELECTRONIC PEN DEVICE

(75) Inventor: Hsien-Chung Chou, Chung-Ho (TW)

(73) Assignee: Beauty Up Co., Ltd., Chung-Ho, Taipei Hsien (TW)

( * ) Notice: Subject to any disclaimer, the term of this patent is extended or adjusted under 35 U.S.C. 154(b) by 597 days.

(21) Appl. No.: 10/828,608

(22) Filed: Apr. 20, 2004

(65) Prior Publication Data

US 2005/0231488 A1  Oct. 20, 2005

(51) Int. Cl.
*G09G 5/00* (2006.01)

(52) U.S. Cl. .................................... 345/179; 178/18.01

(58) Field of Classification Search .. 178/18.01–18.11, 178/19.01–19; 345/173, 179, 180, 181–183
See application file for complete search history.

(56) References Cited

U.S. PATENT DOCUMENTS 5,861,877 A * 1/1999 Kagayama et al. ......... 345/179

6,567,078 B2 * 5/2003 Ogawa ....................... 345/179

* cited by examiner

*Primary Examiner*—Richard Hjerpe
*Assistant Examiner*—Abbas Abdulselam

(57) ABSTRACT

An electronic pen device is proposed, which can be coupled to a computer platform having a display unit and an input-sensing unit, allowing a user to manually input data and/or graphs to the computer platform via the electronic pen device. The electronic pen device includes a micro-processing unit (MPU), a storage unit for storing color-corresponding codes, an input unit for allowing the user to set a display color for the handwriting data and/or graphs to be displayed on the display unit, and a signal output module. The MPU retrieves a color-corresponding code from the storage unit corresponding to the set display color and sends a color signal corresponding to the color-corresponding code to the signal output module that further sends the color signal to the computer platform. The display unit then displays the handwriting data and/or graphs in the set display color responsive to the color signal.

4 Claims, 3 Drawing Sheets

ELECTRONIC PEN DEVICE

FIELD OF THE INVENTION

The present invention relates to electronic pen devices, and more particularly, to an electronic pen applied to a computer platform with handwriting input capability, to allow the computer platform to display handwriting data or graphs according to colors set by a user.

BACKGROUND OF THE INVENTION

In order to reduce dust floating in the air, white board is increasingly used as one of the teaching tools for lectures, but, like the black board, it has a limited writing area. Thus, a lecturer has to repeatedly erase the white board in order to write new contents, and the audience is forced to write down notes quickly before the contents on the white board are erased.

With advances in the electronic technology, computers and software techniques, a white board with scanning functionality has emerged. The white board area can be scanned and stored, and the contents thereon can be printed out, allowing the audience to focus on the lecture instead of writing notes down. Often, the lecturer would use white board pens of various colors to mark contents distinctively. It is sometimes troublesome and time-consuming for the lecturer to locate and swap the desired color pen among the different color pens provided.

In addition, input devices for a typical computer platform, such as portable personal computer, desktop personal computer or PDA (personal digital assistant) device, are no longer limited to keyboard and mouse but also include digital drawing board or touch board that can be used to draw graphs or input data or control the cursor. Also, character recognition software utilized with the touch board or digital drawing board and a digital pen allows text hand-written by the user to be recognized such that it can be stored and accessed electronically. Heading towards an electronic teaching future, electronic handwriting input seems likely to replace the conventional writing manner using the white board pen.

However, the disadvantage of handwriting input described above still remains; that is, the user cannot change the display color at ease, unless the user installs in advance specific editing software to provide a color selection toolframe that allows the user to set the display color for handwriting input by clicking on a color zone in the toolframe. However, the color selection tool-frame has the disadvantage of occupying certain display area on the screen, and it is somewhat inconvenient to operate by clicking.

Therefore, the problem to be solved here is to provide a multicolor pen that allows the user to conveniently and easily change the display color of the handwriting input graphs and data.

SUMMARY OF THE INVENTION

In view of the problems of the prior art, a primary objective of the present invention is to provide an electronic pen device to provide users with multicolor handwriting input.

Another objective of the present invention is to provide an electronic pen device that allows the display color of the handwriting input to be altered without using a color selection tool-frame and editing software.

A further objective of the present invention is to provide an electronic pen device that allows the display color of the handwriting input to be easily and conveniently altered.

In accordance with the above and other objectives, the present invention proposes an electronic pen device that suitably cooperates with a computer platform, the computer platform comprising a display screen and an input-sensing unit, whereby the user can manually input graphs and/or data using the input-sensing unit to the computer platform via the electronic pen device. The electronic pen device comprises a micro-processing unit (MPU) connected to a storage unit for storing color-corresponding codes; an input unit electrically coupled to the MPU, for allowing the user to set the display color for the handwriting input graphs and/or data on the display screen; and a signal output module located at one end of the electronic pen device and electrically coupled to the MPU. According to the input signal received by the input unit, the MPU finds in the storage unit a color-corresponding code corresponding to the input signal, and then, according to the color-corresponding code, the MPU sends out a corresponding color signal via the signal output module to the input-sensing unit of the computer platform, such that the computer platform displays the user's handwriting input graphs and/or data in the selected color on the display screen according to the color signal.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFFERED EMBODIMENT

Figure 1:
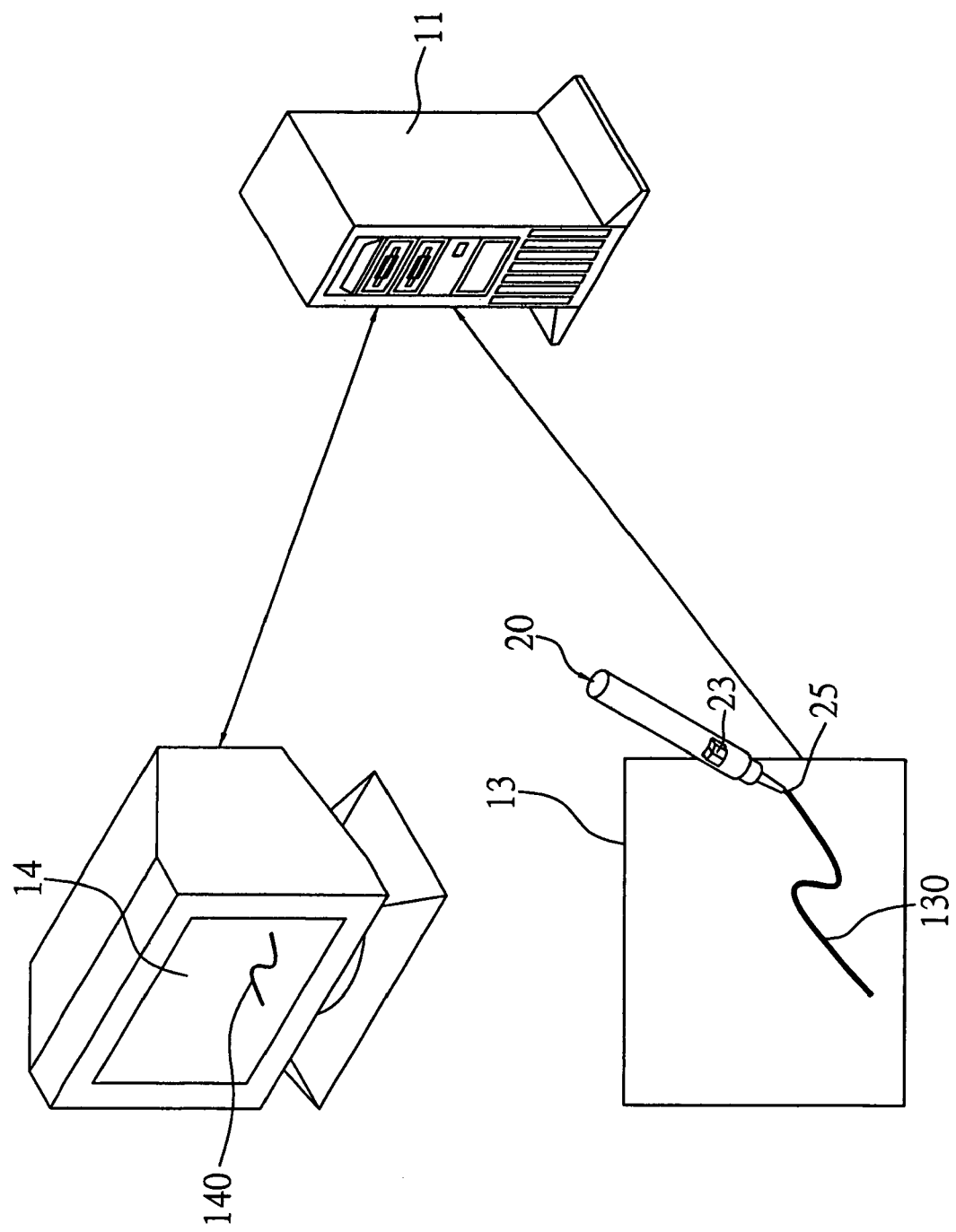
FIG. 1 is an application diagram showing an electronic pen device according to the present invention used with a computer platform.

Please refer to FIG. 1 showing an application diagram of an electronic pen device 20 according to the present invention used with a computer platform such as portable computer, desktop computer, PDA, etc. The computer platform comprises a computer host 11, an input-sensing unit 13 such as handwriting digital board, and a display unit 14 such as display screen. The input-sensing unit 13 and the display unit 14 are connected to the computer host 11 (only those peripheral devices that are relevant to the present invention are shown; other unrelated devices such as keyboard, mouse, etc., are not shown for the purpose of simplicity). The handwriting digital board is a well-known input device, therefore the functions and inner structures thereof not to be further described here. The electronic pen device 20 has one end such as penpoint 25 mounted with a coil component to be in contact with the input-sensing unit 13. When the user sets a desired display color for handwriting data and/or graphs via a button set 23 on the electronic pen device 20 and inputs the handwriting data and/or graphs 130 via the penpoint 25 to the input-sensing unit 13, the input-sensing unit 13 sends the handwriting data and/or graphs 130 and a corresponding color signal to the computer host 11, allowing the display unit 14 to display the handwriting data and/or graphs 140 in the desired color.

Figure 2:
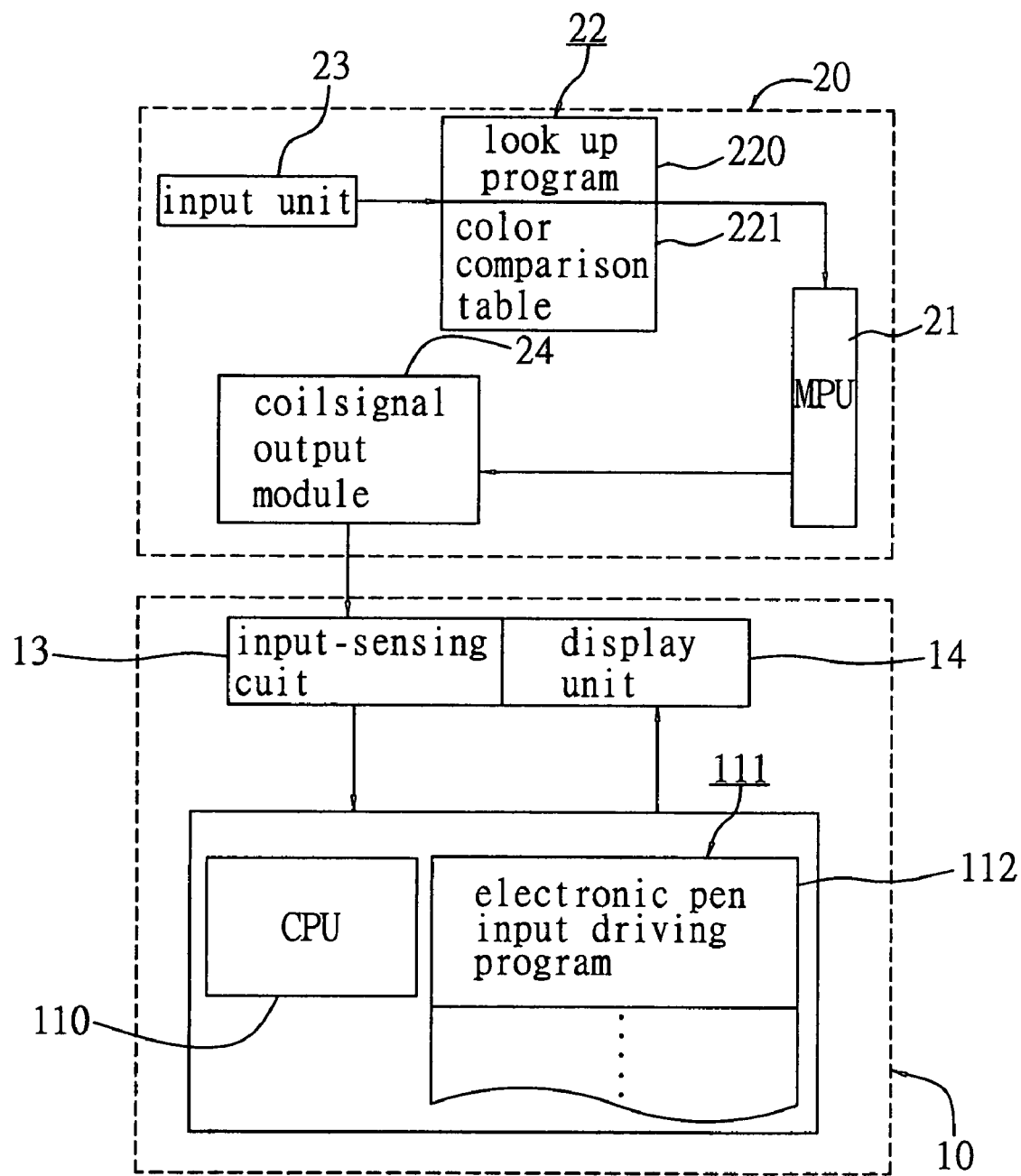
FIG. 2 is a block diagram showing the basic structural relationship between the computer platform and the electronic pen device of FIG. 1.

Refer to FIG. 2, which shows the basic structural relationship between the computer platform 10 and the electronic pen device 20 of FIG. 1. As shown, the electronic pen device 20 comprises a MPU (micro-processing unit) 21, a storage unit 22, an input unit 23 and a coil signal output module 24; and the computer platform 10 comprises a central processing unit (CPU) 110, a memory unit 111, the input-sensing unit 13, and the display unit 14. The storage unit 22, input unit 23 and coil signal output module 24 are electrically coupled to the MPU 21, and the coil signal output module 24 is further electrically coupled to the input-sensing unit 13 of the computer platform 10.

The MPU 21 is used to perform various programs stored in the storage unit 22, to allow the electronic pen device 20 to provide processing functions for the user, and the processed signals generated during processing are transmitted via the coil signal output module 24 to the computer platform 10.

The input unit 23 allows the user to input the desired display color for the handwriting data and/or graphs. The input unit 23 can be a button set, allowing different buttons of the button set to be pushed by the user to inform the MPU 21 of the corresponding different display colors selected by the user. The input unit 23 generates a button input signal corresponding to the selected display color.

The storage unit 22 is used to store programs and data related to operation of the electronic pen device 20, allowing the stored programs and data to be read by the MPU 21. The storage unit 22 stores a look up program 220 and a color comparison table 221, wherein the color comparison table 221 is used to store button input signals and color-corresponding codes corresponding to the button input signals. The MPU 21 can execute the look up program 220 to find a color-corresponding code in the color comparison table 221 according to the button input signal sent from the input unit 23. Then the MPU 21 generates a color signal according to the color-corresponding code and sends the color signal to the coil signal output module 24. The coil signal output module 24 further transmits the color signal electromagnetically to the input-sensing unit 13 of the computer platform 10, and the handwriting data and/or graphs 130 are input via the penpoint 25 of the electronic pen device 20 to the input-sensing unit 13. As a result, the display unit 14 displays the handwriting data and/or graphs 140 in the selected display color. The detailed process flow is disclosed in FIG. 3 and described as follows.

It should be noted that when the electronic pen device 20 is used with the computer platform 10, an electronic pen input driving program 112 is required to be stored in the memory unit 111 of the computer platform 10. When the computer platform 10 actuates the input-sensing unit 13 to receive and sense the color signal, the CPU 110 executes the electronic pen input driving program 112 to determine the display color corresponding to the color signal from the coil signal output module 24 and the handwriting data and/or graphs that are transmitted via the input-sensing unit 13 to the CPU 110, so as to allow the display unit 14 to display the handwriting data and/or graphs in the desired display color. Therefore, when the computer platform 10 performs a specific editing program (for example, Painter), the user is provided with an easy and convenient way of switching or selecting the display color of the handwriting input data and/or graphs. The electronic pen device 20 uses batteries or public electricity as the power supply.

Figure 3:
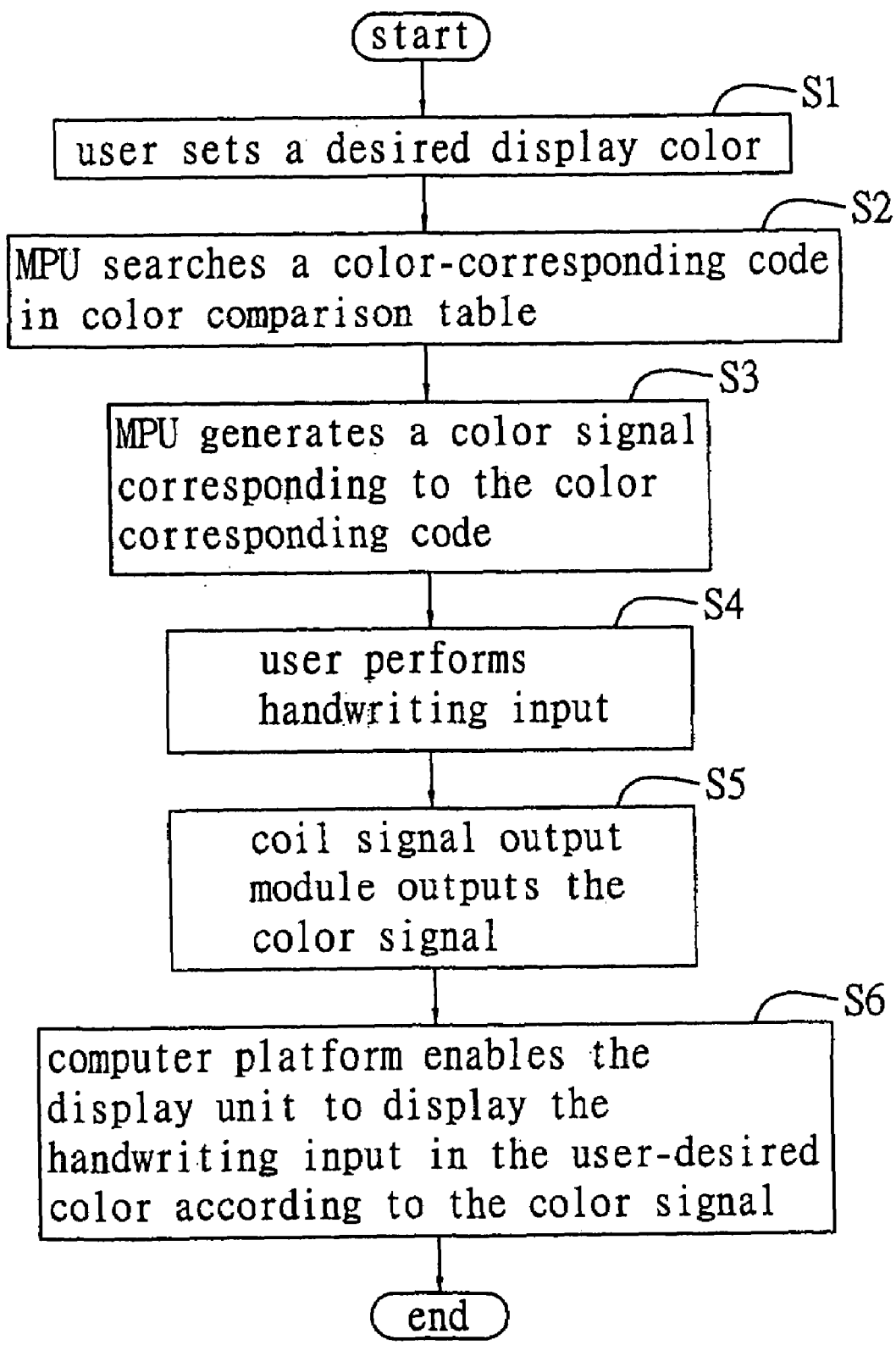
FIG. 3 is a flowchart showing operational procedures in the use of the computer platform and the electronic pen device of FIG. 2.

Referring to FIG. 3 showing operational procedures in the use of the computer platform and the electronic pen device of FIG. 2, when the user intends to use the electronic pen device 20 to manually input data and/or graphs, the computer platform 10 executes the electronic pen input driving program 112, and step S1 is performed. In step S1, the user sets a desired display color for handwriting data and/or graphs via the input unit 23 of the electronic pen device 20, making the input unit 23 send out a signal corresponding to the set display color. Then step S2 is performed.

In step S2, the MPU 21 of the electronic pen device 20 executes the look up program 220 from the storage unit 22 and searches in the color comparison table 221 a color-corresponding code corresponding to the signal from the input unit 23. Then step S3 is performed.

In step S3, the MPU 21 generates a color signal corresponding to the searched color-corresponding code. Then step S4 is performed.

In step S4, the user uses the electronic pen device 20 to manually write data and/or graphs on the input-sensing unit 13, and the color signal generated from the MPU 21 is sent to the coil signal output module 24. Then step S5 is performed.

In step S5, the coil signal output module 24 outputs the color signal to the input-sensing unit 13. Then step S6 is performed.

In step S6, the computer platform 10 enables the display unit 14 to display the handwriting data and/or graphs in the user-desired display color according to the color signal. It should be noted that the computer platform 10 also performs a handwriting input positioning process that is known in the art and not to be detailed here.

Therefore, the electronic pen device according to the present invention allows the user to manually input data and/or graphs and simultaneously input or set a display color for the handwriting data and/or graphs in a convenient and easy way. This avoids the need in the prior art to open a color selection tool-frame in the use of the editing tool or software, and thus would not affect or reduce the handwriting area and browsing area. In addition, the electronic pen device is also suitably applied to a large display screen or in the case with larger distance between the user and the display screen, without causing inconvenience of selecting the display color for the handwriting data and graphs to the user. Therefore, the electronic pen device according to the present invention has better practicality and improvement than the conventional electronic handwriting input technology.

The invention has been described using exemplary preferred embodiments. However, it is to be understood that the scope of the invention is not limited to the disclosed embodiments. For example, the input-sensing unit 13 can be not only a handwriting digital board, but also an electronic white board, tablet PC (personal computer), touch panel, etc. In addition, the coil signal output module 24 of the electronic pen device 20 can be replaced with an infrared output module (not shown), and the computer platform 10 is provided with an infrared receiving module (not shown) to receive color signal from the infrared output module, such that the display unit 14 can display the pressure-sensed handwriting data from the touch panel with the display color corresponding to the color signal. On the contrary, it is intended to cover various modifications and similar arrangements. The scope of the claims, therefore, should be accorded the broadest interpretation so as to encompass all such modifications and similar arrangements.

What is claimed is:

1. An electronic pen device for a computer platform, the computer platform comprising a display unit and an input-sensing unit, allowing a user to input handwriting data and/or graphs on the input-sensing unit via the electronic pen device to the computer platform, the electronic pen device comprising:

a micro-processing unit (MPU);

a storage unit coupled to the MPU, for storing a plurality of color-corresponding codes;

an input unit electrically coupled to the MPU, for allowing the user to set a display color for the handwriting data and/or graphs to be displayed on the display unit, and generating a signal corresponding to the set display color; and a signal output module located at one end of the electronic pen device and electrically coupled to the MPU and the input-sensing unit of the computer platform, for receiving the signal from the input unit to allow the MPU to search one of the color-corresponding codes from the storage unit corresponding to the signal from the input unit, such that the MPU sends out a color signal corresponding to the searched color-corresponding code to the signal output module that further transmits the color signal to the input-sensing unit of the computer platform, and the computer platform enables the display unit to display the user's handwriting data and/or graphs in the set display color according to the color signal.

2. The electronic pen device as claimed in claim 1, wherein the input unit comprises a button set.

3. The electronic pen device as claimed in claim 1, wherein the input-sensing unit is selected from the group consisting of a handwriting digital board, electronic white board, tablet PC (personal computer) and touch panel.

4. The electronic pen device as claimed in claim 1, wherein the signal output module is a coil signal output module transmitting the color signal electromagnetically to the input-sensing unit.

* * * * *